US008294055B2

(12) United States Patent
Kim et al.

(10) Patent No.: US 8,294,055 B2
(45) Date of Patent: Oct. 23, 2012

(54) ELECTRONIC DEVICE CASE AND METHOD FOR MANUFACTURING THE SAME

(75) Inventors: Cheul Gon Kim, Suwon-si (KR); Jun Gyu Song, Suwon-Si (KR); Kyoung Min Lee, Hwaseong-si (KR); Jun Ho Park, Hwaseong-si (KR); Jin Ho Jung, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 438 days.

(21) Appl. No.: 12/585,727

(22) Filed: Sep. 23, 2009

(65) Prior Publication Data

US 2010/0085692 A1    Apr. 8, 2010

(30) Foreign Application Priority Data

Oct. 2, 2008    (KR) .................. 10-2008-0097018

(51) Int. Cl.
*H01H 9/00*    (2006.01)
(52) U.S. Cl. ......... 200/600; 200/333; 345/156; 345/173
(58) Field of Classification Search .............. 200/5 R, 200/5 A, 600, 310–317, 296, 333; 341/22, 341/33; 345/173
See application file for complete search history.

(56) References Cited

U.S. PATENT DOCUMENTS

| | | | | |
|---|---|---|---|---|
| 6,960,735 B2 * | 11/2005 | Hein et al. | | 200/600 |
| 7,556,204 B2 * | 7/2009 | Jacobsen | | 235/472.01 |
| 7,791,587 B2 * | 9/2010 | Kosugi et al. | | 345/156 |
| 7,989,725 B2 * | 8/2011 | Boddie et al. | | 200/600 |
| 2002/0158838 A1 * | 10/2002 | Smith et al. | | 345/156 |
| 2003/0095095 A1 * | 5/2003 | Pihlaja | | 345/156 |
| 2005/0012723 A1 * | 1/2005 | Pallakoff | | 345/173 |
| 2008/0257706 A1 * | 10/2008 | Haag | | 200/600 |
| 2009/0073130 A1 * | 3/2009 | Weber et al. | | 345/173 |
| 2010/0013499 A1 * | 1/2010 | Tong et al. | | 324/661 |
| 2010/0079153 A1 * | 4/2010 | Maloof et al. | | 324/658 |

FOREIGN PATENT DOCUMENTS

| | | |
|---|---|---|
| JP | 2005-322657 | 11/2005 |
| KR | 10-0393320 | 6/2003 |
| KR | 10-2005-0120434 | 12/2005 |
| KR | 10-0556265 | 3/2006 |
| KR | 10-0578400 | 5/2006 |

OTHER PUBLICATIONS

Abstract of KR 10-2002-0063649 published Aug. 5, 2002.
Abstract of KR 10-2005-0112917 published Dec. 1, 2005.

* cited by examiner

*Primary Examiner* — Michael Friedhofer
(74) *Attorney, Agent, or Firm* — Harness, Dickey & Pierce, P.L.C.

(57) ABSTRACT

Disclosed are an electronic device case provided with a touch sensor unit having an improved adherence structure and a method for manufacturing the same. The electronic device case includes a cover, and a touch sensor unit arranged on a front surface of the cover.

18 Claims, 15 Drawing Sheets

ELECTRONIC DEVICE CASE AND METHOD FOR MANUFACTURING THE SAME

CROSS-REFERENCE TO RELATED APPLICATION(S)

This application claims priority under 35 U.S.C. §119 to Korean Patent Application No. 10-2008-0097018, filed on Oct. 2, 2008, in the Korean Intellectual Property Office (KIPO), the entire contents of which are herein incorporated by reference.

BACKGROUND

1. Field

Example embodiments relate to an electronic device case and a method for manufacturing the same. More specifically, example embodiments relate to an electronic device case provided with a touch sensor unit and a method for manufacturing the same.

2. Description of the Related Art

A variety of touch input-type electronic devices, wherein information is input by a user's touch applied to a case surface thereof, have been developed and manufactured. Conventional touch input-type electronic device cases include a cover, and a touch sensor unit which is adhered to a rear surface of the cover through a means, for example, a double-sided tape, and has a size corresponding to a touch region.

An example of touch input-type electronic device is a touch screen. A touch screen is a device that displays image information input by touching a finger or pen thereto without using any input device, for example, a keyboard or mouse. A conventional touch screen includes a cover, a touch sensor unit, and a display member arranged on a rear surface of the touch sensor unit. In the conventional touch screen, the image information displayed on the display member passes through the touch sensor unit and the cover and is then transferred to users.

SUMMARY

Example embodiments provide an electronic device case provided with an improved adherence structure of a touch sensor unit, and a method for manufacturing the same.

Additional aspects and/or advantages of example embodiments will be set forth in part in the description which follows and, in part, will be obvious from the description, or may be learned by practice of the invention.

In accordance with example embodiments, an electronic device case may include a cover a touch sensor unit arranged on a front surface of the cover.

In accordance with example embodiments, an electronic device may include a cover, a display member on a rear surface of the cover, and a touch sensor unit provided on a front surface of the cover, the touch sensor unit surrounding the display member and forming a frame shape.

In accordance with example embodiments, a method for manufacturing an electronic device case including a cover and a touch sensor unit arranged on a front surface of the cover may include preparing a base film, forming a printing layer on the base film, forming a touch sensor unit on the printing layer, and inserting the base film into a mold and in-mold injecting the mold, to form the cover, wherein the touch sensor unit is arranged on the front surface of the cover.

In accordance with example embodiments an electronic device case may include a cover and a touch sensor unit arranged on a front surface of the cover.

The cover and the touch sensor unit may be integrally in-mold formed.

The electronic device case may further include a printing layer provided on the touch sensor unit, and the printing layer may include a transmission region and a non-transmission region, wherein the touch sensor unit surrounds the transmission region to sense touch applied to the transmission region.

The touch sensor unit may include one or more touch sensors.

The touch sensor unit and the printing layer may be transcribed from a base film to the cover.

The electronic device case may further include a UV coating layer provided on the printing layer.

The electronic device case may further include a protective layer provided under the touch sensor unit.

The electronic device case may further include an adhesive layer provided between the protective layer and the front surface of the cover.

The electronic device case may further include a cover film provided on the printing layer.

The electronic device case may further include a UV coating layer provided on the cover film.

The electronic device case may further include one or more grooves formed on the rear surface of the cover.

The grooves may be arranged at positions corresponding to the touch sensors.

The grooves may form a lattice shape.

In accordance with example embodiments an electronic device may include a cover, a display member provided on a rear surface of the cover, and a touch sensor unit provided on a front surface of the cover, while surrounding the display member to form a frame shape.

The cover and the touch sensor unit may be integrally in-mold formed.

In accordance with example embodiments a method for manufacturing an electronic device case including a cover and a touch sensor unit arranged on the front surface of the cover may include preparing a base film, forming a printing layer on the base film, forming a touch sensor unit on the printing layer, and inserting the base film into a mold and in-mold injecting the mold to form a cover, wherein the touch sensor unit is arranged on the front surface of the cover.

The printing layer may include a transmission region and a non-transmission region, and the touch sensor unit may be formed in the form of a frame along the edge of the non-transmission region of the printing layer.

The method may further include forming a UV coating layer between the base film and the printing layer.

The method may further include removing the base film, after the in-mold injection.

BRIEF DESCRIPTION OF THE DRAWINGS

Example embodiments will be more clearly understood from the following detailed description taken in conjunction with the accompanying drawings. FIGS. 1-6 represent non-limiting, example embodiments as described herein.

FIG. 1 is an exploded perspective view illustrating an electronic device according to example embodiments;

FIGS. 4A-4H are process views illustrating a method for manufacturing the case of the electronic device according to example embodiments;

FIG. 5 is a partially-exploded sectional view illustrating the case of the electronic device according to example embodiments; and FIG. 6 is a rear view illustrating the case of the electronic device according to example embodiments.

DETAILED DESCRIPTION

Figure 1:
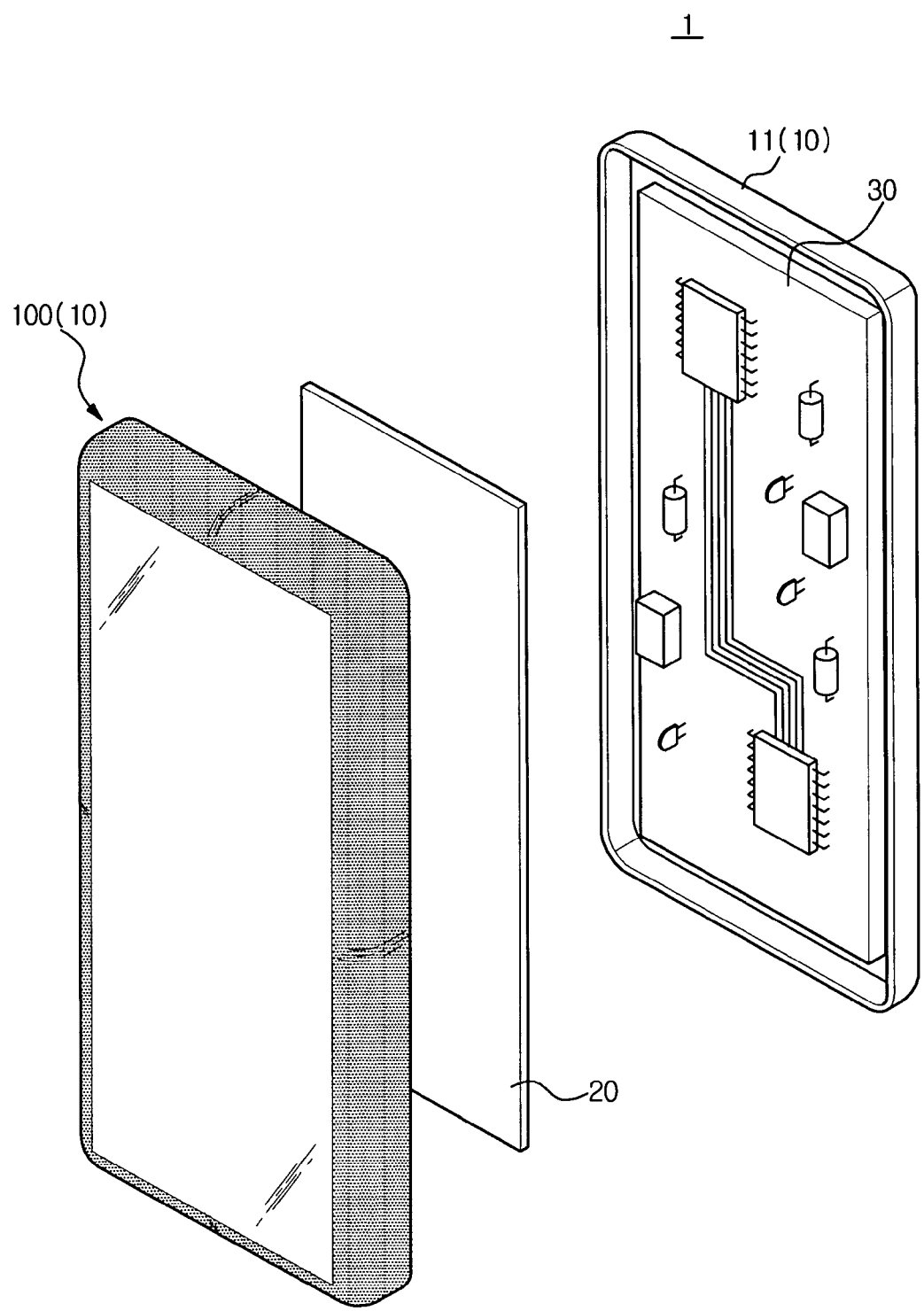

Example embodiments will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

Reference will now be made in detail to example embodiments, examples of which are illustrated in the accompanying drawings, wherein like reference numerals refer to the like elements throughout. Example embodiments are described below by referring to the figures.

FIG. 1 is an exploded perspective view illustrating an electronic device 1 according to example embodiments.

As shown in FIG. 1, the electronic device 1 according to example embodiments may include a case 10, a display member 20, and a printed-circuit board 30 on which various electric components may be mounted. The display member 20 may be housed in the case 10 and may display image information.

The case 10 may include a first case 100 and a second case 11 which may be joined to each other. A user may see image information displayed by the display member 20 through the first case 100.

Figure 2A:
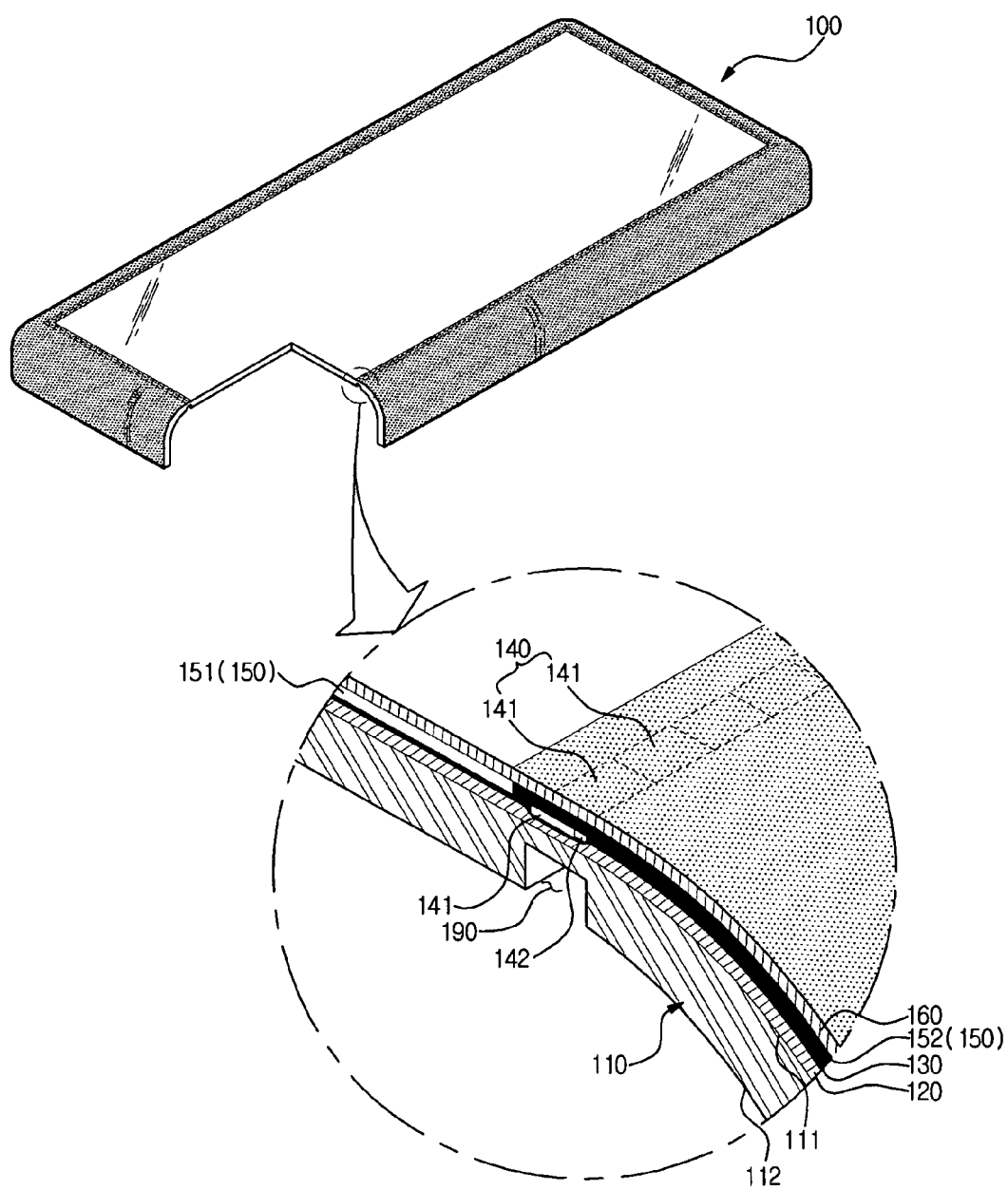
FIG. 2A is an exploded perspective view illustrating a case of the electronic device according to example embodiments.
Figure 2B:
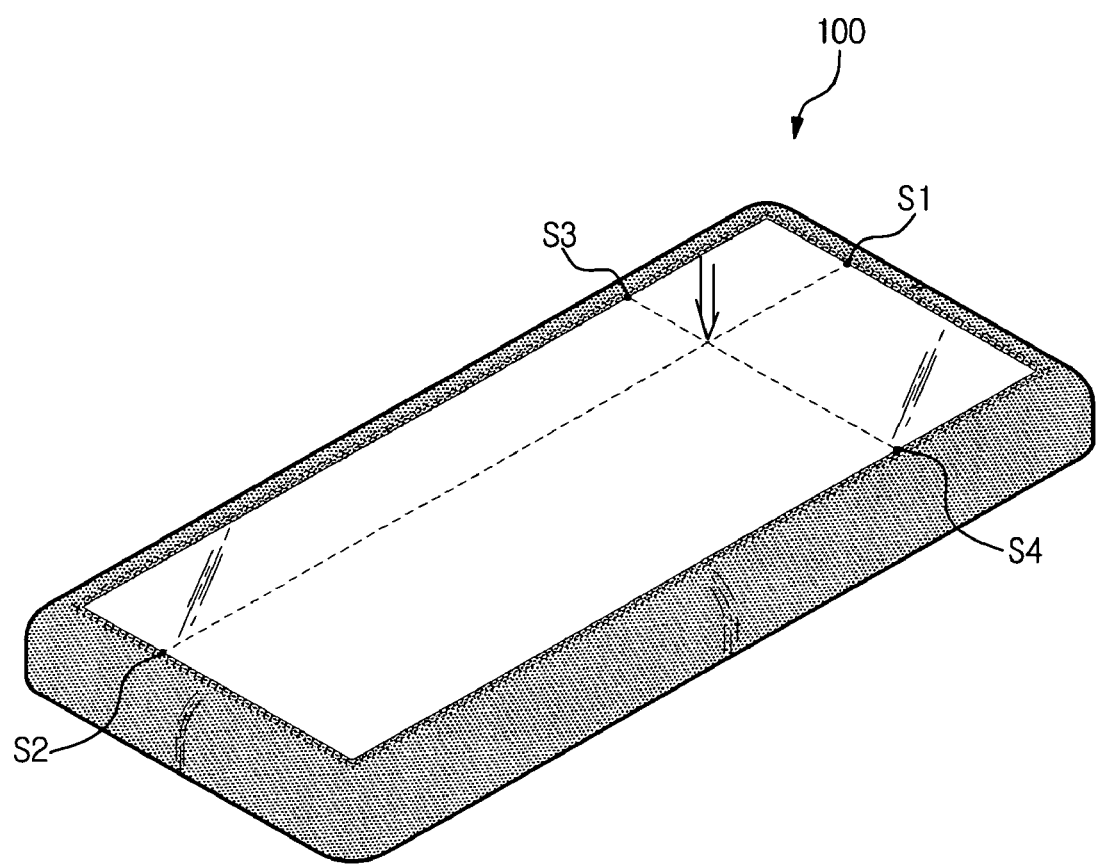
FIG. 2B is a front view illustrating the case according to example embodiments, when a predetermined or preset point is touched by a user.

FIG. 2A is an exploded perspective view illustrating the first case 100 of the electronic device 1 according to example embodiments. FIG. 2B is a front view illustrating the first case 100 according to example embodiments, when a predetermined or preset point is touched by a user.

As shown in FIG. 2A, the first case 100 may include a cover 110 made of a resin, a touch sensor unit 140 provided on a front surface 111 of the cover 110, a printing layer 150 provided on the touch sensor unit 140, and a UV coating layer 160 provided on the printing layer 150. Unrepresented reference numerals 120 and 130 may be an adhesive layer and a protective layer, respectively.

The cover 110 may be made of transparent poly carbonate (PC) so that image information displayed on the display member 20 may be transmitted to the outside.

The printing layer 150 may include a transmission region 151 and a non-transmission region 152. The transmission region 151 may allow image information displayed on the display member 20 to be transmitted to the outside. The non-transmission region 152 may be provided on an edge of the cover 110 to define the transmission region 151. The printing layer 150 may be provided with a predetermined or preset pattern.

The touch sensor unit 140 may be provided around the transmission region 151 and may be configured to sense whether or not the first case 100 is touched. For example, as shown in FIG. 2B, when a predetermined or preset area of the transmission region 151 is touched, sensors S1, S2, S3 and S4 of the touch sensor unit 140 surrounding the transmission region 151 sense touch positions and touch forces. Although the case wherein touching of the transmission region 151 is sensed is exemplified in FIG. 2B, touching of the non-transmission region 152 of an electronic device in example embodiments may also be sensed.

In example embodiments, the touch sensor unit 140 may include one or more touch sensors 141 and the touch sensors 141 may be electrically connected through a terminal 142 to electric components, for example, a printed-circuit board. PCT Pub. Number WO 2008/026818, which is herein incorporated by reference, and EP 2057448, which is also incorporated by reference, provides examples of touch sensors, therefore, a detailed explanation thereof is omitted for the sake of brevity. Additionally, the touch sensor unit according to example embodiments may further include other sensors having a predetermined or preset structure.

As a result, the electronic device 1 according to example embodiments may exhibit relatively improved sensor sensitivity and speed, when compared to an electronic device having a touch sensor unit provided on a rear surface of a cover. Because the touch sensor unit 140 of an electronic device according to example embodiments may be provided on the front surface 111 of the cover 110, the touch sensors 141 may directly receive a touch applied by a user. Accordingly, a sensor sensitivity and speed may be improved.

In addition, the electronic device 1 according to example embodiments may exhibit improved visibility of the display member. Because the electronic device according to example embodiments has a frame-structure in which the touch sensor unit 140 surrounds the display member 20, image information displayed on the display member 20 may be directly transferred to a user, without passing through a touch sensor unit, thus supplying more vivid image information to the user.

Furthermore, as discussed below, in example embodiments, the cover 110 and the touch sensor unit 140 may be integrally in-mold formed, thus avoiding unwanted phenomena (e.g., permeation of foreign materials and generation of an air layer) which may occur when a touch sensor unit is adhered to a cover with an adhesive agent. Additionally, the cover 110 may impart improved visibility to the display member.

Figure 3A:
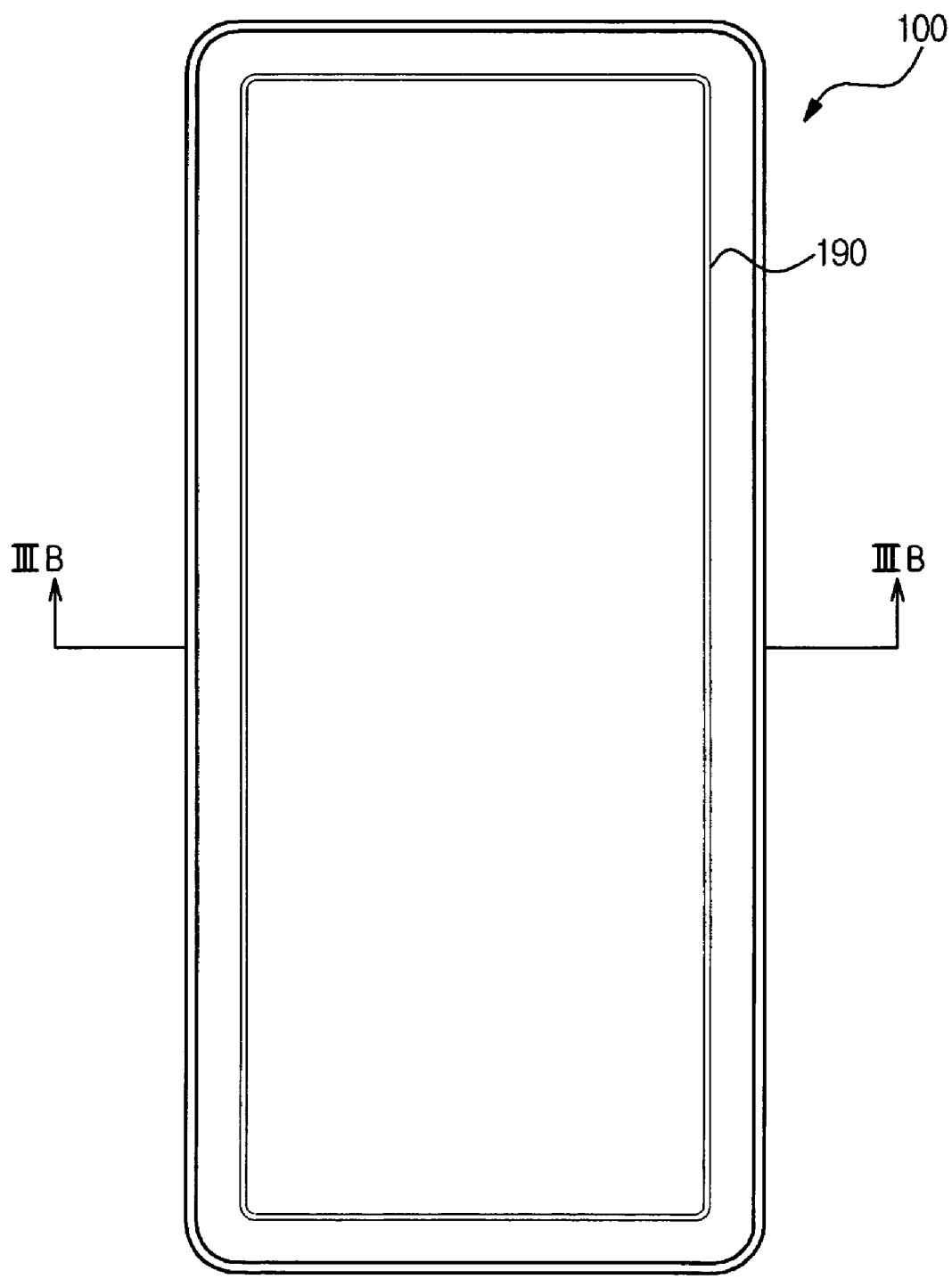
FIG. 3A is a rear view illustrating the case of the electronic device according to example embodiments.
Figure 3B:
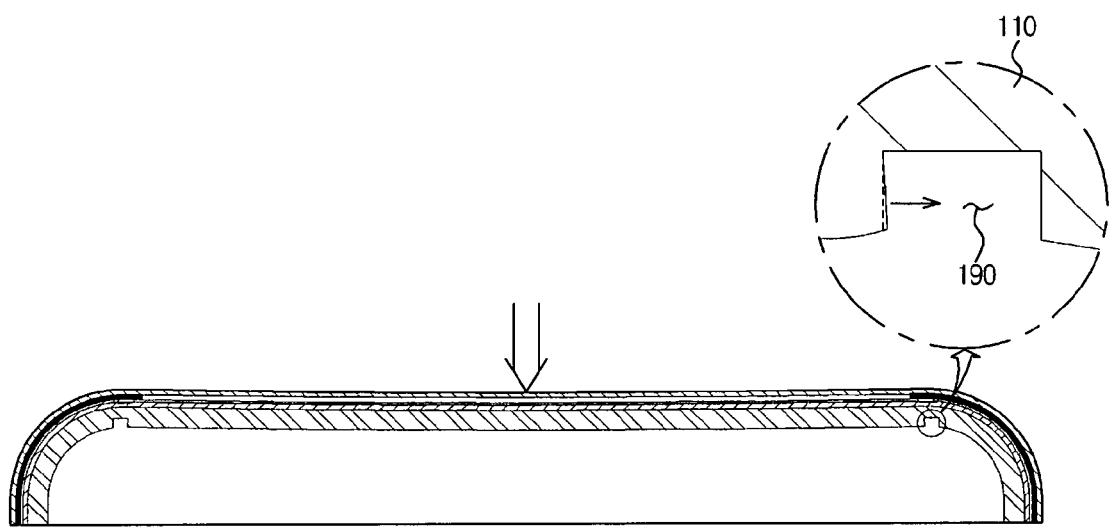
FIG. 3B is a sectional view taken along the line IIIB-IIIB of FIG. 3A, which illustrates the case wherein a force is applied to a sensing region.

FIG. 3A is a rear view illustrating the first case 100 of the electronic device 1 according to example embodiments, and FIG. 3B is a sectional view taken along the line IIIB-IIIB of FIG. 3A. FIGS. 3A and 3B illustrate a first case wherein a force is applied to a sensing region.

As shown in FIGS. 3A and 3B (See also FIG. 2A), the first case 100 of the electronic device 1 may further include one or more grooves 190 provided on the rear surface 112 of the cover 110. The grooves 190 may be arranged in a position corresponding to the touch sensor unit 140, as shown in the drawings.

The groove 190 in the cover may provide for improved sensor sensitivity. More specifically, the groove may increase the flexibility of the cover the cover 110 near the touch sensor unit 140, therefore the touch sensors 141 of the touch sensor unit 140 may more readily sense touch, thus improving sensor sensitivity.

FIGS. 4A-4H are process views illustrating a method for manufacturing the first case 100 of the electronic device 1 according to example embodiments.

Figure 4A:
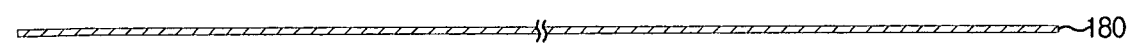
Figure 4B:
Figure 4C:
Figure 4D:
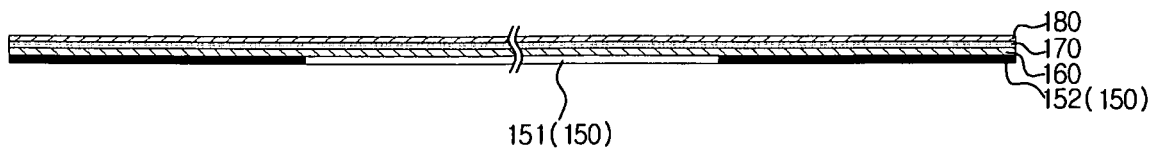
Figure 4E:
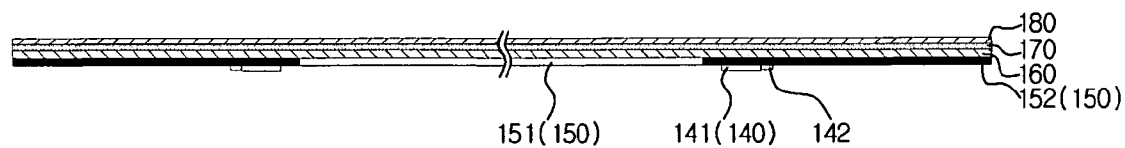
Figure 4F:
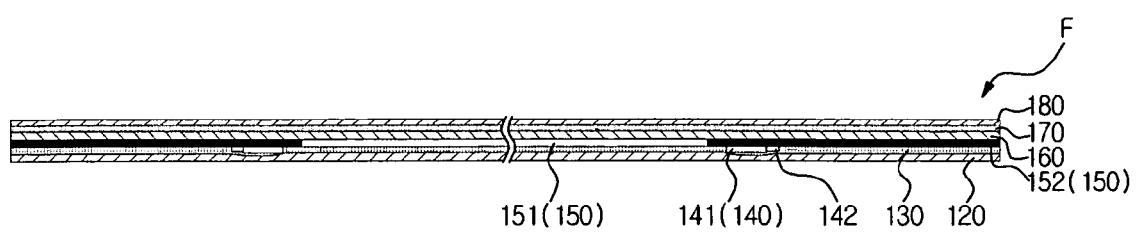
Figure 4G:
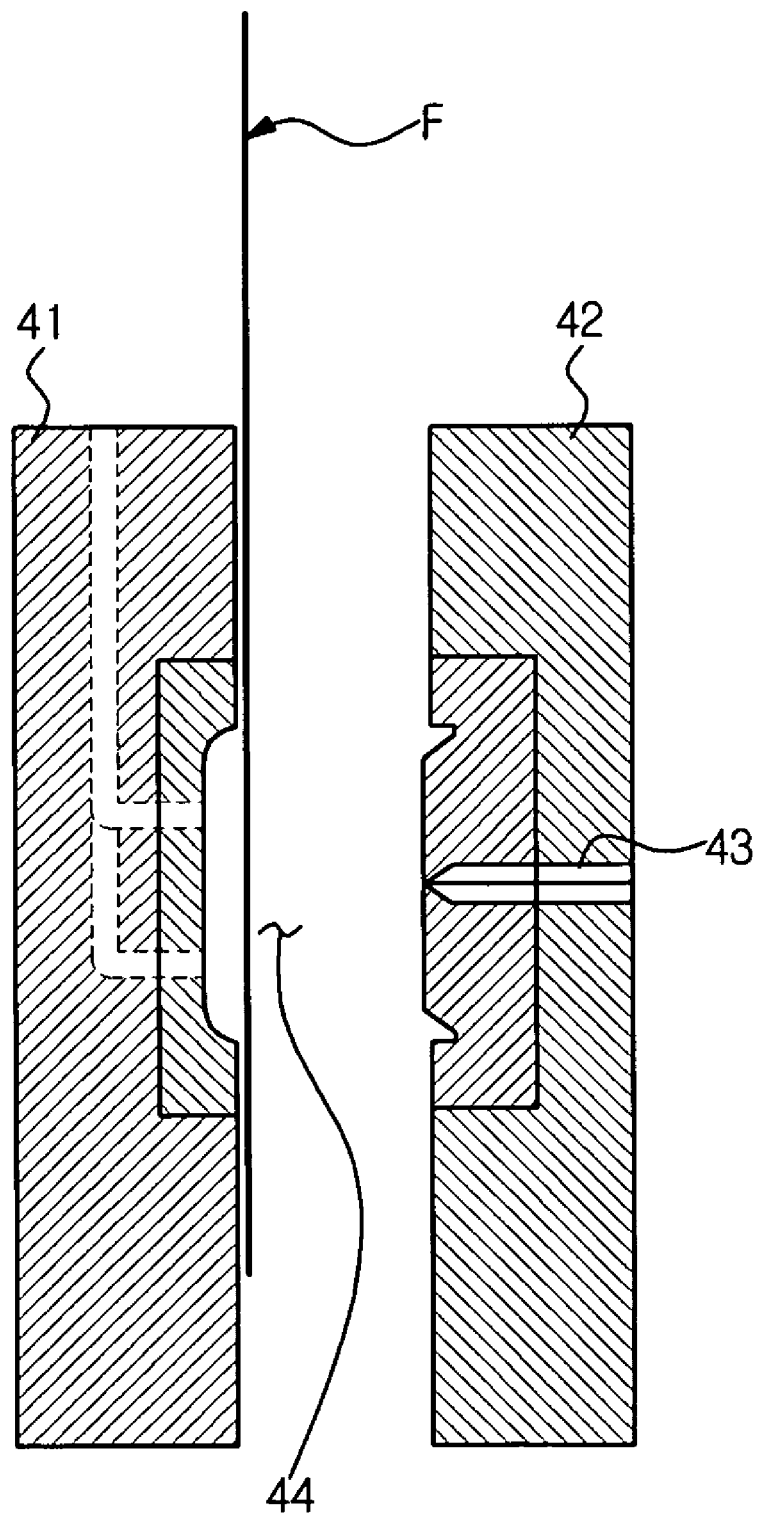
Figure 4H:
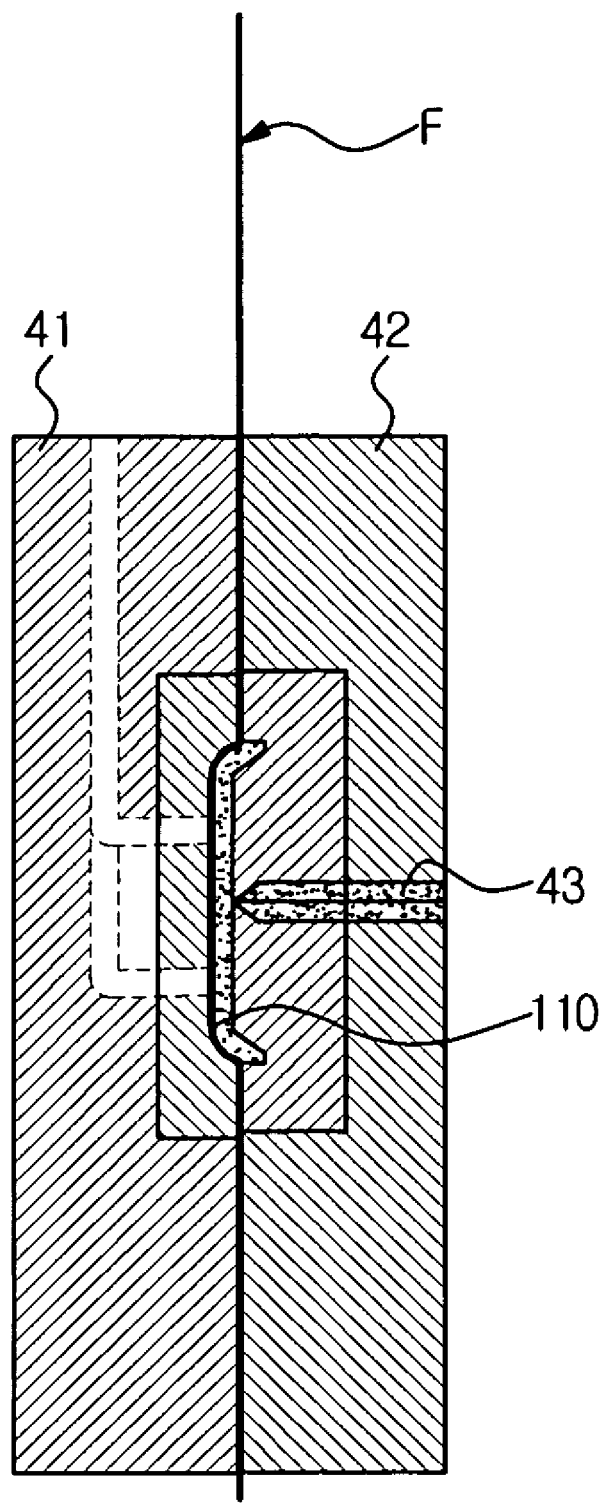

As shown in FIGS. 4A to 4C, a release layer 170 and a UV coating layer 160 may be formed on a surface of a prepared base film 180. As shown in FIG. 4D, a printing layer 150 may be formed on a surface of the UV coating layer 160. The transmission layer may be divided into a transmission region 151 and a non-transmission region 152. In accordance with example embodiments, light may be readily transmitted through the transmission region 151 whereas light may retarded or hardly transmitted through the non-transmission region 152. As shown in FIGS. 4E and 4F, a touch sensor unit 140 may be provided with a plurality of touch sensors 141 and a terminal 142 electrically connected to the touch sensor unit 140. The touch sensor unit 140 may be formed around the transmission region 151, and a protective layer 130 and an adhesive layer 120 may be sequentially formed thereon. As shown in FIGS. 4G and 4H, a film F for in-mold injection obtained by the process shown in FIGS. 4A to 4F may be inserted between a fixed mold 41 and a movable mold 42, and a molten resin may fill in a cavity 44 through a sprue 43 to form a cover 110. In this process, the UV coating layer 160, the printing layer 150, the touch sensor unit 140, the protective layer 130, and the adhesive layer 120 may be transcribed to the cover, to in-mold form the touch sensor unit 140 integrally with the cover 110. The base film 180 and the release layer 170 may be removed to complete the manufacturing of the first case 100 according to example embodiments.

The manufacturing process according to example embodiments is given for the purpose of illustration and is not intended to limit the invention.

Furthermore, the present invention may be accomplished in various embodiments.

Figure 5:
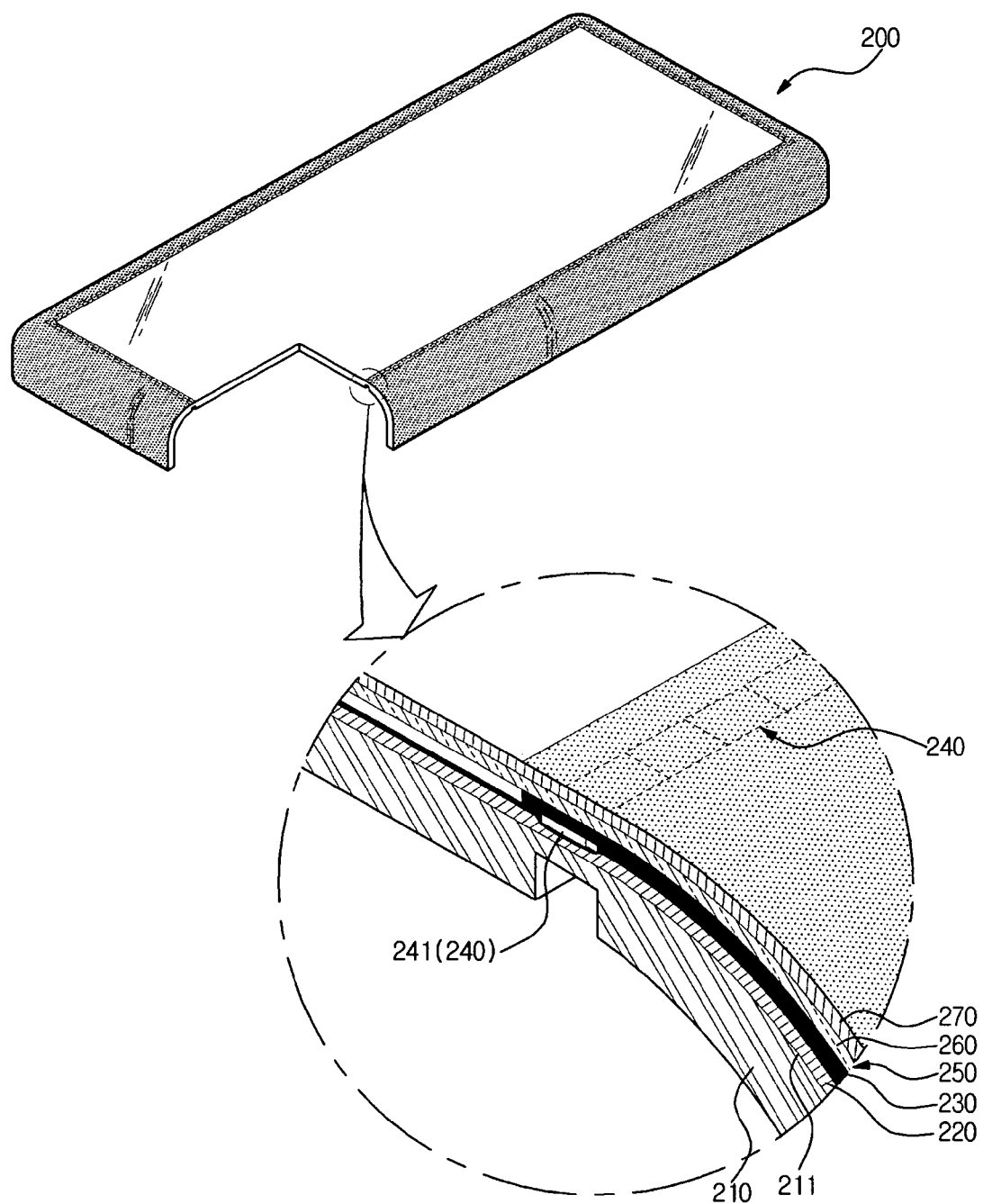

FIG. 5 is a partially-exploded sectional view illustrating a first case 200 of an electronic device according to example embodiments.

As shown in FIG. 5, the first case 200 may include a cover 210 made of a resin, a touch sensor unit 240 including one or more touch sensors 241 provided on the front surface 211 of the cover 210, a printing layer 250 provided on the touch sensor unit 240, a cover film 260 provided on the printing layer 250, and a UV coating layer 270 provided on the cover film 260. Unrepresented reference numerals 220 and 230 may be an adhesive layer and a protective layer, respectively.

Figure 6:
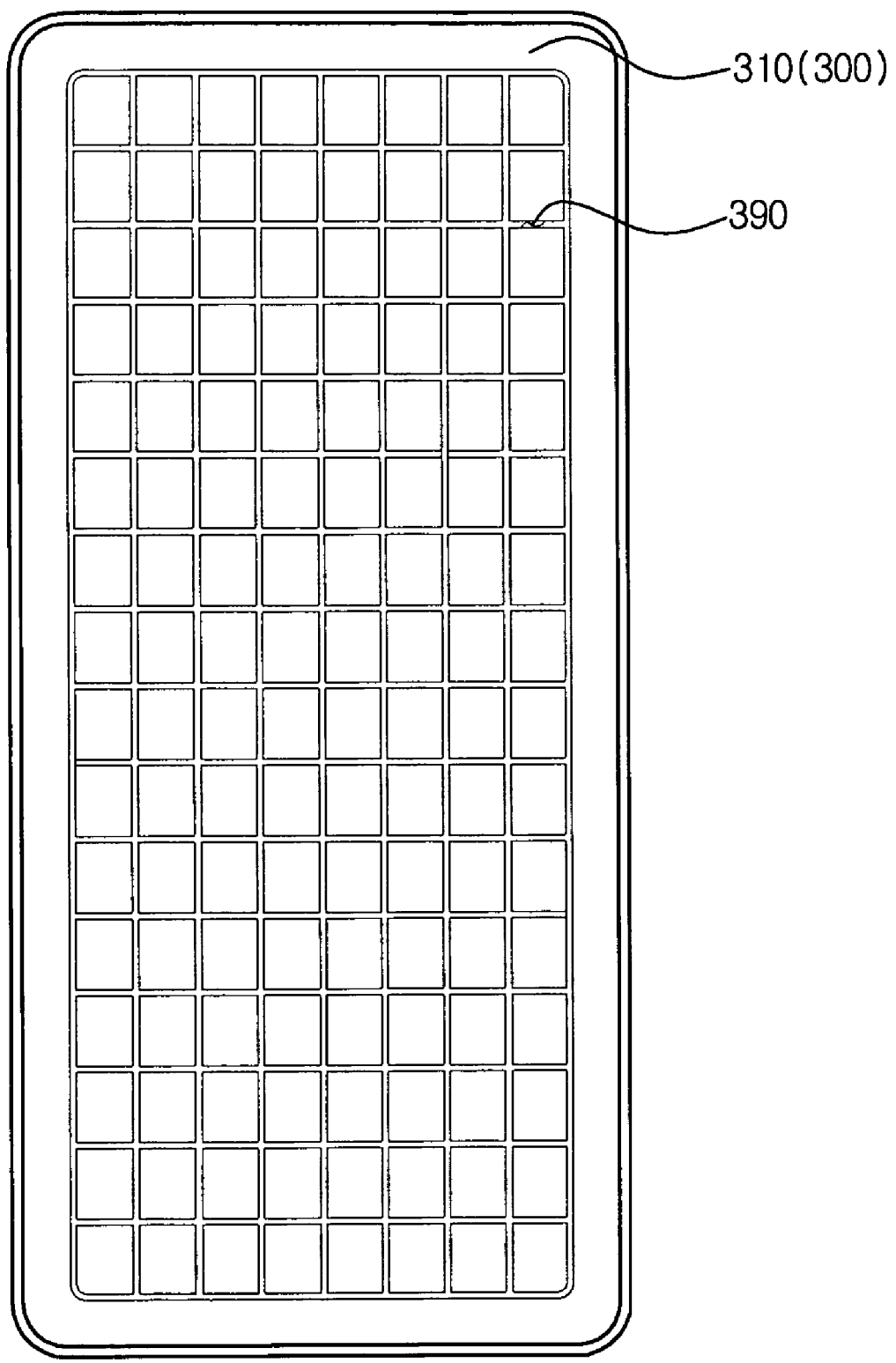

FIG. 6 is a rear view illustrating the first case 300 of the electronic device according to example embodiments.

As shown in FIG. 6, the first case 300 according to example embodiments may include lattice-shape grooves 390 provided on a rear surface of the cover 310. The shapes of grooves disclosed herein is given for the purpose of illustration and may have various other shapes.

The electronic device cases according to example embodiments may be variably changed, and may be utilized in a variety of electronic devices including mobile equipment, for example, MP3 players, portable multimedia players (PMPs), and digital multimedia broadcasting (DMB) phones.

As apparent from the fore-going, the electronic device cases according to example embodiments advantageously may include a touch sensor unit having an improved adherence structure.

While example embodiments have been particularly shown and described with reference to example embodiments thereof, it will be understood by those of ordinary skill in the art that various changes in form and details may be made therein without departing from the spirit and scope of the following claims.

What is claimed is:

1. An electronic device case comprising:
    a cover including at least one groove on a rear surface; and
    a touch sensor unit arranged on a front surface of the cover.

2. The electronic device case according to claim 1, wherein the cover and the touch sensor unit are integrally in-mold formed.

3. The electronic device case according to claim 2, further comprising:
    a printing layer on the touch sensor unit, the printing layer including a transmission region and a non-transmission region,
    wherein the touch sensor unit surrounds the transmission region to sense touch applied to the transmission region.

4. The electronic device case according to claim 3, wherein the touch sensor unit includes at least one touch sensor.

5. The electronic device case according to claim 3, wherein the touch sensor unit and the printing layer are transcribed from a base film to the cover.

6. The electronic device case according to claim 3, further comprising:
    a UV coating layer on the printing layer.

7. The electronic device case according to claim 3, further comprising:
    a protective layer under the touch sensor unit.

8. The electronic device case according to claim 7, further comprising:
an adhesive layer between the protective layer and the front surface of the cover.

9. The electronic device case according to claim 3, further comprising:
a cover film on the printing layer.

10. The electronic device case according to claim 9, further comprising:
a UV coating layer on the cover film.

11. The electronic device case according to claim 1, wherein the at least one groove is arranged under to the touch sensor unit.

12. The electronic device case according to claim 1, wherein the at least one groove forms a lattice shape.

13. An electronic device comprising:
a cover including at least one groove formed on a rear surface;
a display member on a rear surface of the cover; and
a touch sensor unit provided on a front surface of the cover, the touch sensor unit surrounding the display member and forming a frame shape.

14. The electronic device according to claim 13, wherein the cover and the touch sensor unit are integrally in-mold formed.

15. A method for manufacturing an electronic device case including a cover and a touch sensor unit arranged on a front surface of the cover, comprising:
preparing a base film;
forming a printing layer on the base film;
forming a touch sensor unit on the printing layer;
inserting the base film into a mold and in-mold injecting the mold, to form the cover, including at least one groove on a rear surface, wherein the touch sensor unit is arranged on the front surface of the cover.

16. The method according to claim 15, wherein the printing layer includes a transmission region and a non-transmission region,
the touch sensor unit forms a frame along at least one edge of the transmission region of the printing layer.

17. The method according to claim 15, further comprising:
forming a UV coating layer between the base film and the printing layer.

18. The method according to claim 15, further comprising:
removing the base film.

* * * * *